United States Patent [19]
Kimbel et al.

[11] Patent Number: 5,678,292
[45] Date of Patent: Oct. 21, 1997

[54] HAND-HELD MACHINE FOR SANDING HAVING SWASH PLATE OSCILLATION MEANS

[76] Inventors: Erich Kimbel; Jill Taylor; Gerd Buchter, all of Werderstr. 9 (Performa Design), 65195 Wiesbaden, Germany

[21] Appl. No.: 491,413

[22] Filed: Jun. 16, 1995

[30] Foreign Application Priority Data

Mar. 10, 1995 [DE] Germany .................. 295 04 138 U

[51] Int. Cl.$^6$ ............................................ B27B 11/00
[52] U.S. Cl. .............................. 29/76.4; 173/47; 451/356
[58] Field of Search ........................... 29/76.1, 76.4; 173/47, 48, 104, 109; 144/1.1, 35.1, 104, 121, 136.2; 30/392, 394; 451/356

[56] References Cited

U.S. PATENT DOCUMENTS

| | | |
|---|---|---|
| 3,120,845 | 2/1964 | Horner . |
| 3,720,269 | 3/1973 | Wanner et al. . |
| 3,841,416 | 10/1974 | Pfister ................... 173/47 |
| 4,090,297 | 5/1978 | Wanner et al. ............. 451/356 |
| 5,036,925 | 8/1991 | Wache ..................... 173/48 |

FOREIGN PATENT DOCUMENTS

| | | | |
|---|---|---|---|
| 9315498 | 5/1994 | Germany | .......... B29C 37/00 |
| 29508308 | 8/1995 | Germany . | |

*Primary Examiner*—Daniel W. Howell
*Assistant Examiner*—Kenneth J. Hansen
*Attorney, Agent, or Firm*—Barnes, Kisselle, Raisch, Choate, Whittemore & Hulbert, P.C.

[57] ABSTRACT

A hand-held machine tool for a workpiece, comprising a casing having first and second hollows therein, an electric motor enclosed in said first hollow and having a driving shaft, a driving mechanism accommodated in said second hollow and being drivingly connected to said driving shaft. The driving mechanism includes a driven shaft and means for rotating and oscillating the driven shaft. A tool holder is provided on the driven shaft for holding a tool having a working surface adapted for sanding, rasping or filing a workpiece, a handle is fixedly connected to the casing and includes electric power conducting means and a switch for energizing and deenergizing the electric motor, and a guide and support for mounting attached to the casing.

8 Claims, 6 Drawing Sheets

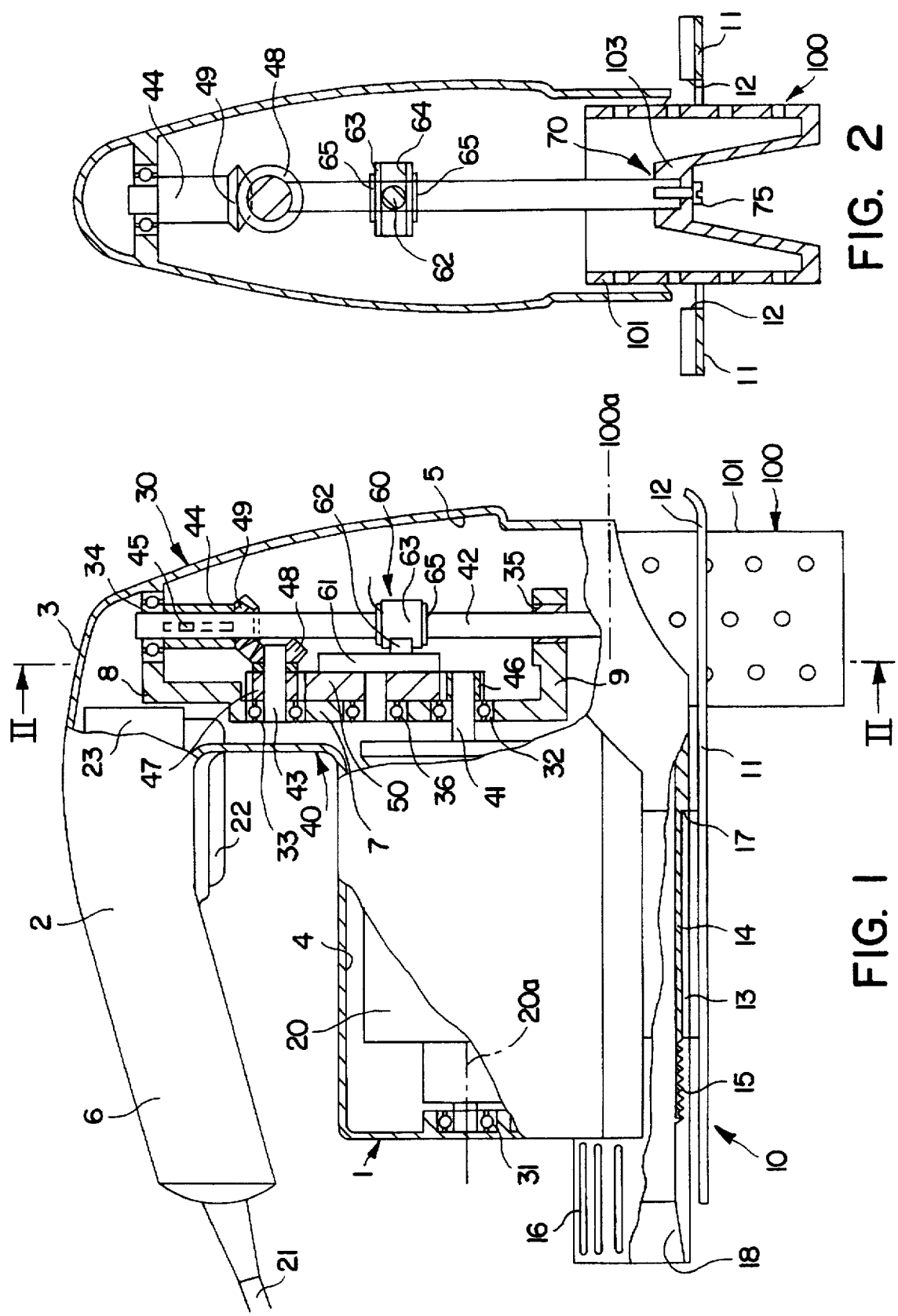

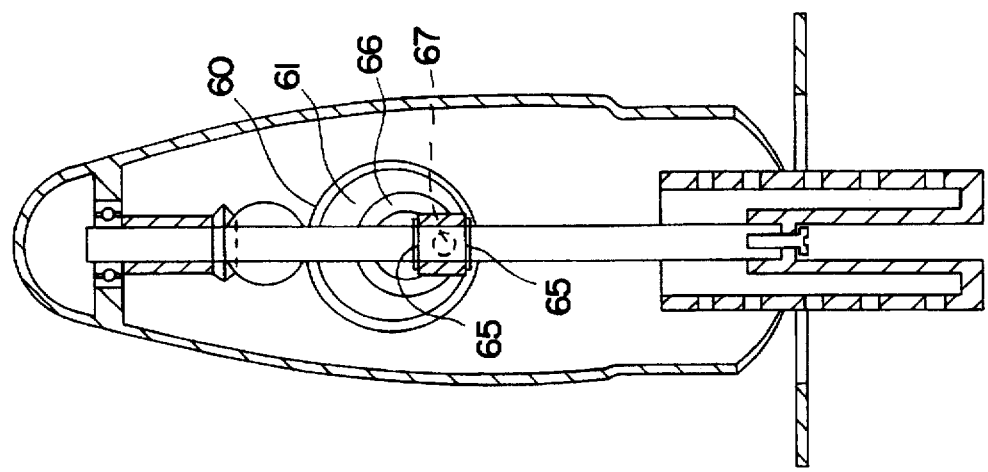
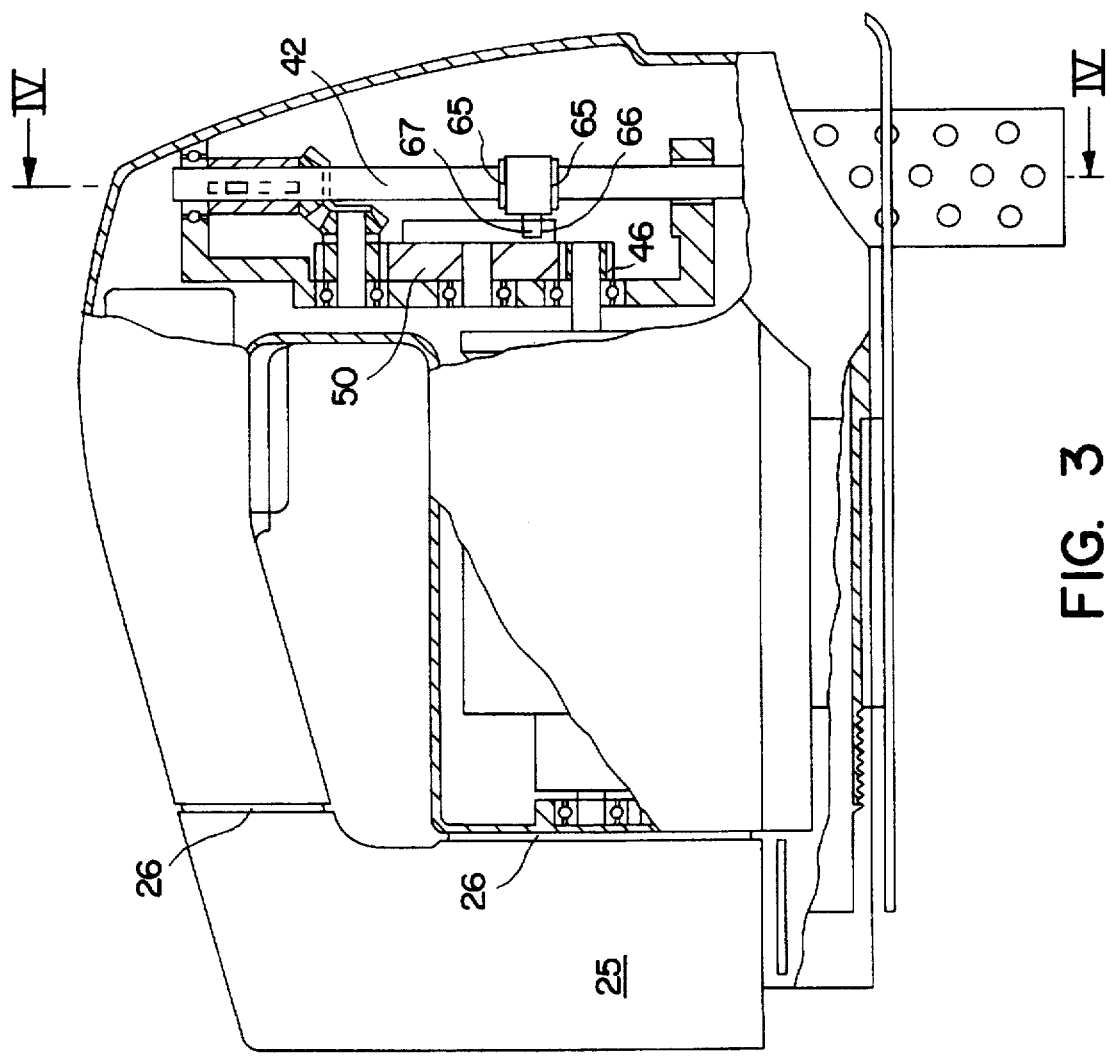
FIG. 4
FIG. 3

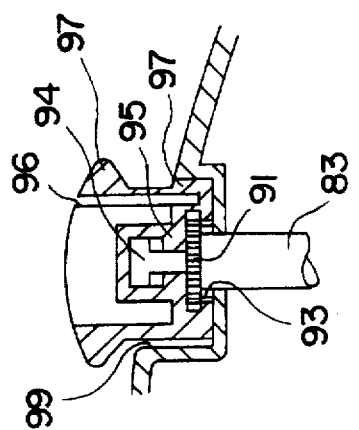
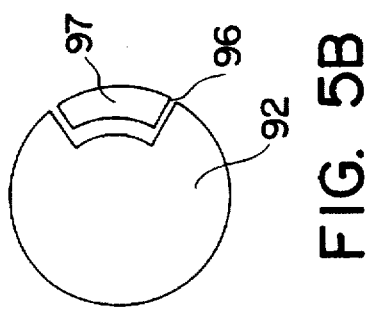
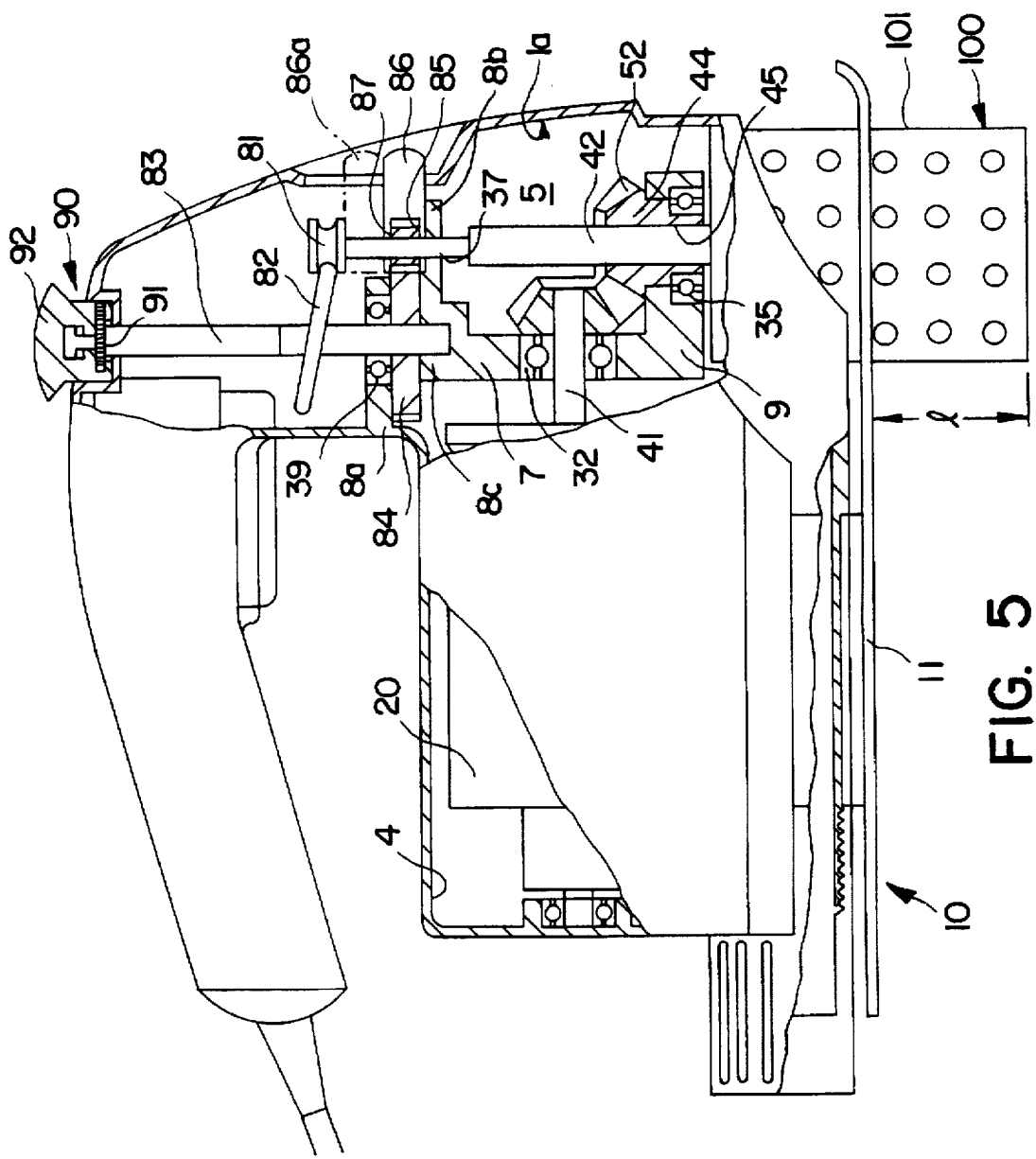

HAND-HELD MACHINE FOR SANDING HAVING SWASH PLATE OSCILLATION MEANS

FIELD OF THE INVENTION

The invention relates to machines for the do-it-yourselfer and particularly to a hand-held machine tool for working on edges or surfaces of workpieces such as sanding, rasping or filing a workpiece.

BACKGROUND AND OBJECTS

There are many tools for do-it-yourself work, yet a hand-held machine tool for sanding, rasping or filing adapted for the needs of the do-it-yourselfer seems not to be on the market.

It is therefore an object of the present invention to provide a machine tool for sanding, rasping or filing which is small in size and can be hold by hand.

It is another object of the present invention to provide a machine tool for sanding, rasping or filing which is simple in construction.

A further object of the present invention is to provide a machine tool for sanding, rasping or filing which can be produced economically.

A further object of the invention is to provide a machine tool for sanding, rasping or filing which can be applied for many purposes and is versatile.

A still further object is to provide a machine tool which is adapted for working onto interior surfaces and edges.

SUMMARY OF THE INVENTION

In a preferred embodiment of the invention, the hand-held machine tool has an all-over design similar to a jig saw, that is, a casing has two hollows which enclose an electric motor and a drive mechanism, respectively. The electric motor defines an axis, and parallel thereto a base plate as a guiding and supporting means is provided which can be angled in both directions up to 45° from its neutral position in which the tool extends perpendicularly to the plane of the base plate. The driving mechanism is designed for producing a rotating and oscillating movement to a shaft which is used as the tool holder.

In another embodiment of the invention, the hand-held machine tool takes an outer shape similar to an electric drill, yet including a base plate as a guiding and supporting means at the exit end of the driven shaft which may be rotated and oscillated.

In a still further, simplified embodiment of the invention, the drive mechanism is provided only for rotating the tool.

All embodiments of the invention may be provided with vacuum ducts to allow the dust to be sucked away.

The electric motor of the machine tool may be energized through a cable, yet it is also possible to provide accus for energization.

BRIEF DESCRIPTION OF THE DRAWINGS

The invention, together with additional objects, features and advantages thereof, will be best understood from the following description, the appended claims and the accompanying drawings, in which FIG. 1 is a schematic side view, partly in cross-section, of a first embodiment of the machine tool of invention.

FIG. 2 is a section along the lines II—II in FIG. 1.

FIG. 3 is a schematic side view of a second embodiment of the machine tool of invention, partly in cross-section.

FIG. 4 is a sectional view along the lines IV—IV in FIG. 3.

FIG. 5 is a side view, with parts broken away, of a third embodiment of the machine tool of invention.

FIGS. 5a, 5b show a knob of the third embodiment in an enlarged cross-section and a plan view, respectively.

DETAILED DESCRIPTION

Figure 6:
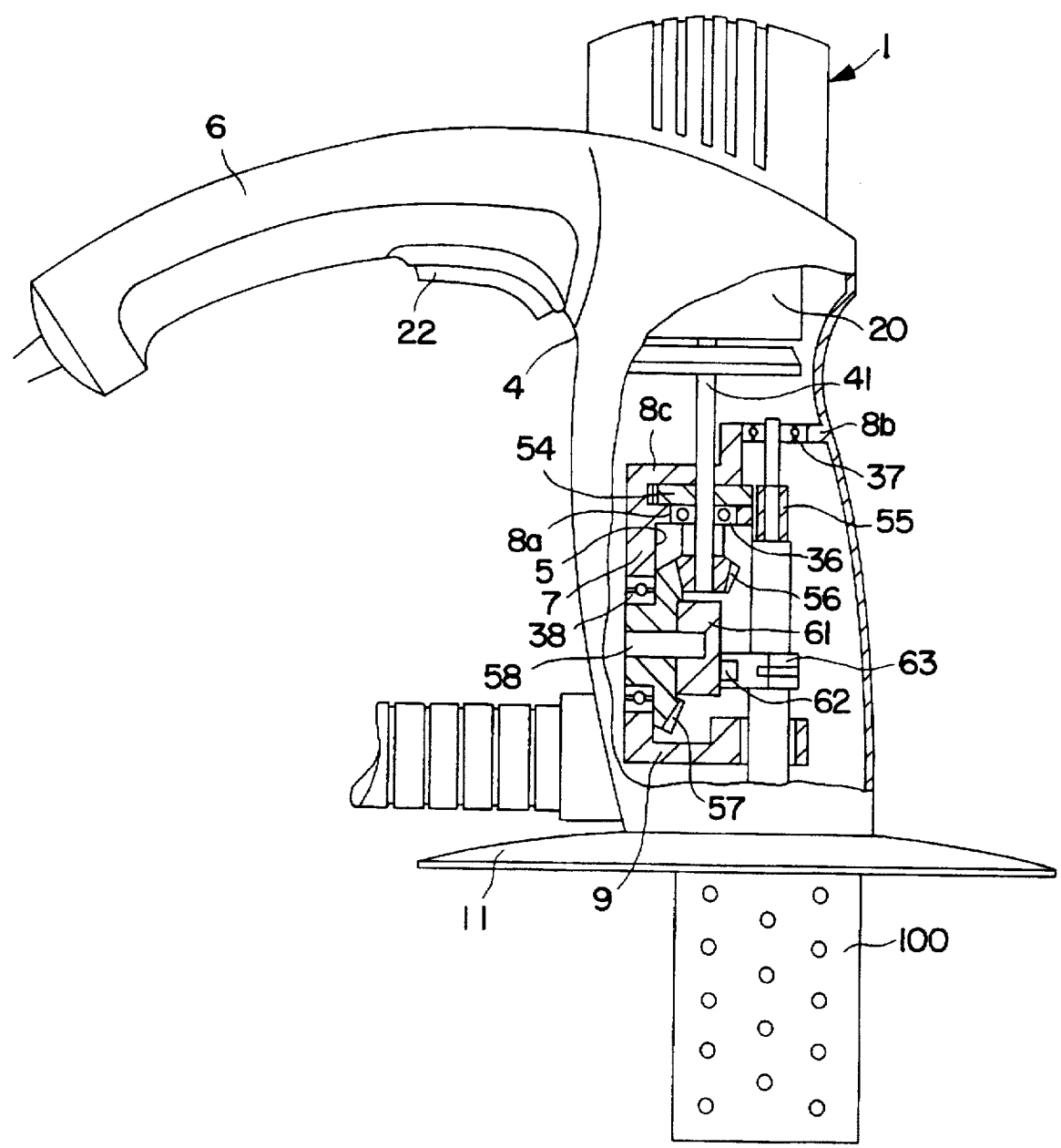
FIG. 6 is a side view, partially in cross-section, of a fourth embodiment of the machine tool of invention.

Referring to FIGS. 1 and 2, the first embodiment of the hand-held machine tool is shown having a casing 1 which has general outlines of a jig saw. The casing 1 is comprised of essentially two shell halves 2 and 3 which mate and are held together by bolts (not shown). The casing 1 includes two main hollows 4 and 5. The hollow is provided for accomodating an electric motor 20 and defines a motor axis 20a. The other hollow 5 is for accomodating a driving mechanism 30 and defines a tool axis 100a which is perpendicular to the motor axis 20a. The driving mechanism is for rotating and oscillating a tool 100 which has an outer cylindrical surface 101 and may be adapted for sanding, rasping or filing a workpiece. At the lower side of the casing 1 and motor 20, a guiding and supporting means 10 extends parallely to the motor axis 20a and includes a base plate or skid plate 11 having a recess 12 through which the tool 100 extends. The plate 11 is fixed to a sleeve 13 having at least a part circular cross section. The sleeve 13 is pivotably mounted in a part circular recess (not shown) of the casing 1, i.e. the shell halves 2, 3 encircle the periphery of the sleeve 13 to about 200° to 300° center angle and hold it so as to form a pivot joint. A tube 14 extends through the sleeve 13 so that the inner end thereof is adjacent the tool 100, and the outer end thereof projects from the casing 1 and is formed as a knob 16. The tube 14 and the casing 1 have threads 15 which interengage so that the tube 14 can be shifted somewhat parallel to the motor axis 20a. The tube 14 has a collar 17 engaging the sleeve 13. The plate 11 may be pivoted about the axis of the sleeve 13 up to 45° from the horizontal, neutral position, and then fixed in the adjusted position by tightening the knob 16 so as to press the collar 17 against the sleeve 13 and clamp the sleeve 13 in position. The machine tool may be connected to a vacuum system (not shown) and for that purpose the interior 18 of the tube 14 is prepared to be connected to a further duct (not shown). The opening of the tube 14 arranged near the upper end of the tool 100 functions as the suction opening.

In the preferred embodiments, the casing 1 is also formed with a handle 6. As shown, an electric cable 21 passes through the walls of the handle 6 into the interior thereof where connections are made to a switch 22 and to the motor 20 so as to energize or deenergize same. In the interior of the handle 6, also some safety equipment 23 can be housed.

The electric motor 20 comprises a shaft 41 which is journalled in bearings 31 and 32 and is the driving or input shaft for the driving mechanism 30. This mechanism 30 includes a gear transmission 40 and an oscillating mechanism 60. The gear transmission 40 comprises a driven or output shaft 42 and two intermediate shafts 43, 44. For journalling these shafts, the second hollow 5 is encircled by partition walls 7, 8, 9, each having openings for accomodating bearings 32, 33, 34, 35 and 36. The partition walls 8 and 9 are arranged perpendicularly to the partition wall 7 at the ends thereof. The gear transmission 40 also comprises meshing gears 46, 47 and 50 to transmit power from shaft 41 to shaft 43 and meshing bevel gears 48, 49 to transmit power between shafts 43, 44. The intermediate shaft 44 is a hollow shaft, and the shaft 42 extends therethrough. Coupling means 45 are provided on the inner surface of the hollow shaft 44 and the outer surface of the shaft 42 so that shaft 42 can move axially, yet is driven in rotational direction when the hollow shaft 44 rotates. Such a coupling 45 can be provided by splines on shafts 42, 45, yet also a dog-groove combination as indicated in the drawings will be sufficient for that purpose.

The oscillating mechanism 60 is for reciprocating the output shaft 42. The intermediate gear 50 carries a disk 61 having a crank pin 62. A two-piece follower member 63 having a groove 64 therein is rotatably fixed to the shaft 42, that is, shaft 42 has spring rings 65 which form shoulders for axially supporting the follower member 63, yet allowing rotational movement thereof. The groove 64 of the follower member 63 allows the crank pin 62 to slide therein. When shaft 41 rotates, the disk 61 also rotates, and the crank pin 62 orbits taking along the follower member 63 which shifts the shaft 42 up and down.

Gears 46, 50 have a diameter ratio of 1 to 7 or 1 to 10, that is, seven (ten) revolutions of shaft 41 correspond to one revolution of gear 50. Gear 47 has a similar diameter than gear 46, and this is also true for bevel gears 48, 49. Therefore, shaft 42 will make seven (ten) revolutions in one reciprocating movement. This is important for the comfortable handling of the machine tool.

Whereas the motor 20 can be of various types and wattages, a type of 1500 to 2000 rev/min and of 500 or 550 watts has proven to correspond to the needs.

Figure 7:
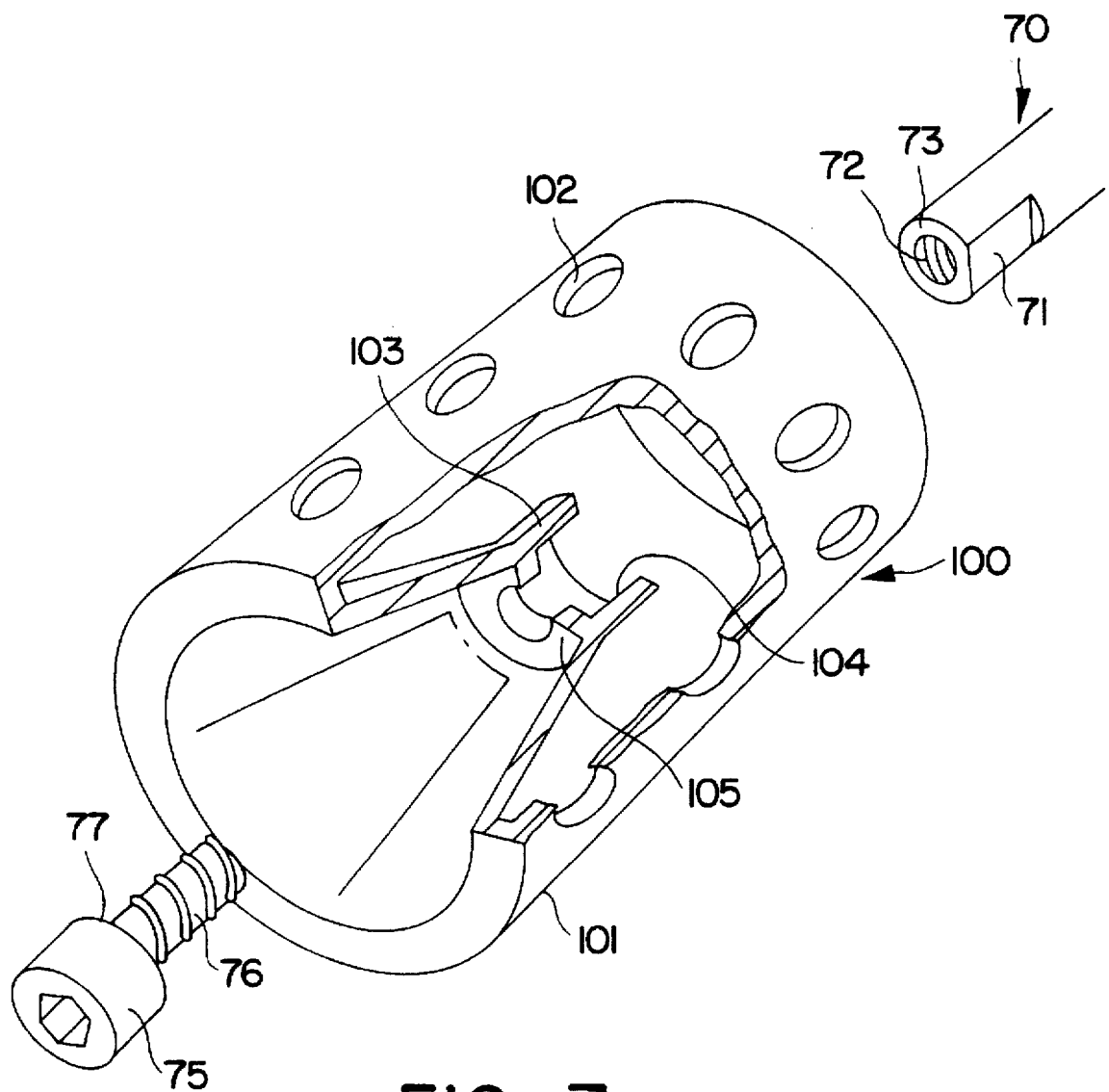
FIG. 7 is an exploded view of a tool holder and tool, partly brocken away.

Shaft 42 has an end formed as a tool holder 70 (see FIGS. 2 and 7). The tool 100 has a generally cylindrical outer surface 101 which is adapted for sanding, rasping or filing operations and may have a plurality of radial holes 102. The tool has a central hub 103 with a noncircular hole 104 in it for being connected to the tool holder 70 which has a flat 71. The tool holder 70 also has a threaded hole 72 for being engaged by a hexagon socket head cap screw 75 so as to hold the tool 100 on the toolholder 70. The hub 103 also has a collar 105 providing a passage for the screw shaft 76 and offering shoulders for the end face 73 of the tool holder 70 and the annular surface 77 of the screw head 75.

As an alternative to the embodiment shown, the base plate 11 of the guiding and supporting means 10 may be pivotionally mounted to the lower side of the casing 1 in a similar manner as is known from jig saws. The base or skid plate 11 defines a guiding axis along its central line (and parallel to the motor axis 20a), and concentric to this guiding axis, guiding means are provided at the lower side of casing 1 which are engaged by appropriate members connected to the plate 11 so that the plate 11 can be pivoted about its central line. A screw bolt admits to fix the pivotional position of the plate 11.

FIGS. 3 and 4 show a second embodiment of the machine tool according to invention. Similar parts show the same reference numbers as in the first embodiment and need not be described further. Instead of being energized by cable, the second embodiment has an accumulator 25 which is coupled to the casing 1 and can be removed for being charged. Male and female connectors 26 are provided within the respective ends of the accumulator 25 and the casing 1 and handle 6 so as to bring the electric energy to the conductors concealed in the handle 6 and leading to the switch 22 and the motor 20.

FIGS. 3 and 4 also show a modification of the means 60 for oscillating output shaft 42. The disk 61 is provided with an excentric groove 66 and the follower member 63 has a pin or peg 67 which engages that groove 66. The follower 63 is rotatably fixed to the output shaft 42 as by spring rings 65 so as to allow a rotational movement of the follower 63 relative to the output shaft 42.

The operation is the same as with the preceding embodiment which also could be used instead of the shown modification of the oscillating device. When the disk 61 rotates, the pin 67 can follow the up-and-down movement of the excentric groove 66 so that the follower 63 oscillates, and the shaft 42 is carried along in this reciprocating movement.

The tool 100 is shown with a smaller diameter of the outer cylindrical surface 105 which is an option for the several tools that can be attached to the machine.

FIG. 5 shows a third embodiment of the machine tool. Similar parts to the preceding embodiments have corresponding reference numbers and need not be described in detail.

The input shaft 41 drives a bevel gear 51 which is in meshing engagement with a bevel gear 52 fixedly connected to an intermediate hollow shaft 44 which at its inner surface has coupling means 45 meshing with corresponding coupling means of the output shaft 42. The up and down movement of shaft 42 is produced by a switchable oscillating means 80. The upper end of output shaft 42 is connected to a cam follower 81 in the form of a grooved roller. The switchable oscillating means 80 has a swash plate 82 for providing upward and downward movement of the cam follower 81 and the shaft 42.

The swash plate 82 is fixed to a shaft 83 which is held against axial movement and journalled in a bearing 39 and rotated by a gear 84 which is driven by a switchable gear 85 which is in engagement with the coupling means 45 of the output shaft 42. In practice, the shaft 42 may be splined at its upper and lower ends, or throughout its entire length.

When the motor 20 is energized, input shaft 41 via bevel gears 51, 52, intermediate shaft 44 and splines 45 drive output shaft 42 which is reciprocated by the action of the cam follower 81 and the swash plate 82. Please note that the diameter ratio of gears 85/84 which is in the range of 1:5 and 1:12 and preferably between 1:7 and 1:10, determines the number of revolutions of the output shaft in one up- and down-movement.

Gear 85 is made switchable by a latchable slider 86 which has fork means 87 engaging the upper and lower sides of the gear 85, respectively. When the slider 86 is shifted to an upper position 86a shown in phantom, and where it is latched, the gears 85, 84 get out of meshing contact and the oscillating movement is shut down, i.e. the tool 100 simply rotates without reciprocating. For that mode of use (simply rotating) an adjusting device 90 for adjusting the position of the tool 100 relative to the plane of the skid plate 11 is provided. The shaft 83 has a disk 91 at its upper end which is positioned outside the hollow 5 of casing 1, and is encompassed by a knob 92 which loosely fits over disk 91 without being turned by the disk 91 when the shaft 83 rotates. The disk 91 has serrations or teeth at its outer periphery which can be engaged by corresponding teeth 93 of the knob 92 when the same is lifted somewhat so as to couple the knob 92 to the disk 91 and therefore also to the shaft 83. Lifting the knob 92 is limited by a shaft extension 94 fixed at the upper end of shaft 83 and forming an undercut portion of that shaft in which a collar 95 of the knob 92 extends. The knob 92 also has a slot 96 (see FIGS. 5a, 5b) so as to form a lever portion 97 which carries a cog or projection 98. The casing 1 forms a circular recess 99 in which the lower end of the knob 92 extends, and the cog 98 engages with bias the annular wall of the recess 99 so that the knob normally is fixed relative to the casing 1. If the lever portion 97 is pressed inwardly of the knob 92, cog 98 is disengaged from the annular wall of recess 99, and the knob 92 may be turned.

In case of the oscillating mode is shut down (slider 86 in position 86a) turning of knob 92 coupled to shaft 83 will lead to turning of swash plate 82 which shifts the output shaft 42 upwardly, or downwardly, depending upon the direction of turning the knob 92. This will shift the tool 100 upwardly, or downwardly, as the case is. In this manner, the working length 1 of the tool 100 in the mode of simply rotating can be adjusted within the stroke length of the swash plate 82.

The FIG. 5 embodiment can be modified in that bevel gear 52 is meshing with a further bevel gear (not shown) which is to be journalled as at place 1a of the casing and carries a crank pin 62 or an excentric groove 66 which are part of an oscillating mechanism 60 as explained with the FIG. 1 to 4 embodiments. The transmission ratio of the oscillating movement to the rotational movement is again given by the diameter ratio of the meshing gears. In this modified embodiment, the switchable oscillating means 80 and the adjusting device 90 have been omitted.

In a simplified version of the FIG. 5 embodiment, the output shaft 42 may be fixedly connected to the bevel gear 52, and members 80 through 99 are again omitted. This simplified version allows rotational movement of the tool without oscillating.

FIG. 6 shows a fourth embodiment of the machine tool of invention which is an embodiment with the outer outlines of an electric drill.

As in the preceeding embodiments, the casing 1 has two main hollows 4 and 5, which however are arranged along a vertical line. Whereas the partition walls 7 and 9 are similar to those of the preceeding embodiments, the partition wall 8 has at least two wall sections 8a, 8b and optionally 8c. The wall sections 8a, 8b, 8c are arranged parallel to one another and have openings for the passage of the input shaft 41 and the output shaft 42, respectively, or for accomodating bearings 36, 37. A gear 55 is wedged on shaft 41 and meshes with a gear 55 on the output shaft 42. Input shaft 41 carries a bevel gear 56 which meshes with a further bevel gear 57 which is fixed at an intermediate shaft 58 journalled in a bearing 38. Bevel gear 57 carries a disk 61 of the oscillating mechanism 60 which corresponds to that described with FIG. 1. Please note that the gear 55 has a length sufficient to take up the stroke length of the oscillating mechanism 60, that is, does not disengage from the gear 54 when reciprocating.

Figure 8:
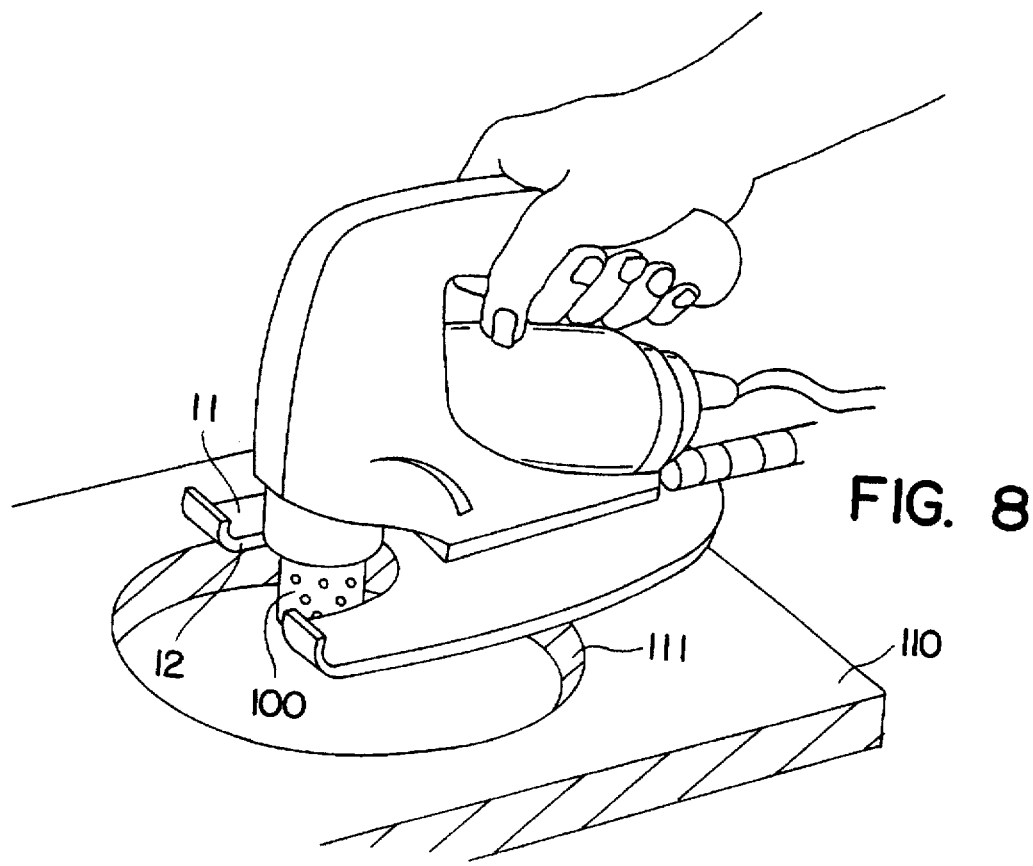
FIG. 8 is a perspective view of the first embodiment in use.
Figure 9:
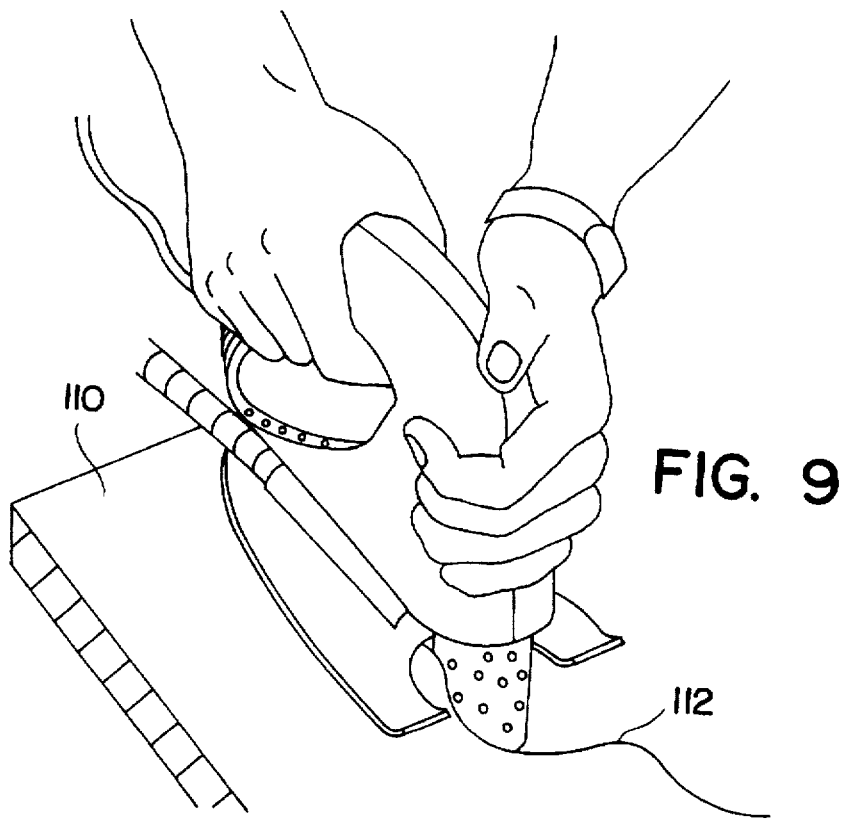
FIG. 9 is another perspective view of the first embodiment in use.

FIGS. 8 and 9 show how to use the machine tool of invention. A workpiece 110 having a hole 111 cut in it by a jig saw can be flattened by the machine tool of invention. As shown, the skid plate 11 is moved on the surface of the workpiece 110 along the rim of the hole 111 so that the tool 100 sands the surface of the hole 111. The work can be done by one hand grasping the handle 6. It is to be noted that such handle 6 extends generally parallel to the skid plate 11 and also to the general extension of the casing 1 accomodating the motor, yet perpendicular to the axial extension of the tool 100. The machine tool may also be held by two hands, as shown in FIG. 9, if a rim or edge surface 112 is to be worked upon.

What is claimed is:

1. A portable power tool comprising
   a housing,
   a motor in said housing and having a motor shaft,
   a handle on said housing and including control means for said motor,
   a driving mechanism in said housing and including an output shaft having a shaft axis,
   a generally cylindrical tool for sanding, rasping or filing a workpiece and attachable to said output shaft,
   means for guiding and supporting said power tool on a workpiece surface and having a recess through which said cylindrical tool extends,
   said driving mechanism being connected to said motor shaft so as to rotatably drive said output shaft, and including means for oscillating said output shaft,
   said oscillating means comprising
      an intermediate shaft which has a shaft axis and is drivingly connected by said driving mechanism to said motor shaft,
      a swash plate which is fixed to said intermediate shaft at a slant angle to said intermediate shaft axis, and
      follower means engaging said swash plate and being connected to said output shaft, so that when said intermediate shaft and said swash plate rotate, said follower means reciprocates oscillating said tool along said output shaft axis.

2. The portable power tool set forth in claim 1 wherein a gear transmission is provided for connecting said intermediate shaft to said motor shaft, said gear transmission including a switchable gear, and wherein switching means is provided for moving said switchable gear in or out of meshing condition with said gear transmission so as to render said oscillating means active or inactive.

3. The portable power tool set forth in claim 2 also comprising means for manually adjusting the rotational position of said intermediate shaft and said swash plate when said oscillating means has been switched inactive.

4. The portable power tool set forth in claim 1 wherein said motor, when running, has an operating speed and said output shaft has a rotational speed and a reciprocating speed, said operating speed and said rotational speed being of a similar value whereas said reciprocating speed is on the order of at least seven times slower than said rotational speed.

5. A hand-held machine tool comprising:
   a casing (1) having first and second hollows (4,5) therein,
   an electric motor (20) enclosed in said first hollow (4) and having a driving shaft (41),
   a driving mechanism (30) accommodated in said second hollow (5) and being drivingly connected to said driving shaft (41),
   said driving mechanism (30) including a driven shaft (42), means for rotating said driven shaft (42) and means (80) for oscillating said driven shaft (42),
   a tool holder (70) on said driven shaft (42) for holding a tool (100) having a working surface (101) adapted for sanding, rasping or filing a workpiece,
   a handle (6) fixedly connected to said casing (1) and including electric power conducting means (21) and a switch (22) for energizing and de-energizing said electric motor (20), and a guiding and supporting means (10) having mounting means (13,14) for being attached to said casing (1), wherein said means for rotating said driven shaft (42) comprises gear transmission means and said means (80) for oscillating comprises a swash plate (82) connected at a slant angle to an intermediate shaft (83), and a grooved roller (81) connected to said driven shaft (42), and further comprising interengaging means which comprise meshing gears (85,84) such when said driven shaft rotates, said intermediate shaft (83) and said swash plate (82) are driven and cause said grooved roller (81) and said driven shaft (42) to reciprocate.

6. The hand-held machine tool set forth in claim 5 wherein said casing (1) has two shell halves (2,3), at least one thereof comprising partition wall means arranged in the form of a C and including a first partition wall (7), a second partition wall arranged transversely to said first partition wall and a third partition wall (9) arranged transversely to said first partition wall and parallel to said second partition wall, said first partition wall (7) having a first opening for accommodating a first bearing (32) for said driving shaft (41) extending normally horizontally, said second partition wall having at least first and second wall sections (8a,8b) arranged in staggered relationship, said first wall section (8a) including a second opening for accommodating a second bearing (30) for said intermediate shaft (83) extending normally upwardly, said second wall section (8b) including a third opening or accommodating a third bearing (37) for said driven shaft (42), said third partition wall (9) having a fourth opening for accommodating a fourth bearing (35) for supporting said driven shaft (42).

7. The hand-held machine tool set forth in claim 5 wherein said guiding and supporting means (10) defines a guiding axis for moving said machine tool parallel to said guiding axis and along a workpiece, and wherein said mounting means of said guiding and supporting means (10) includes a pivot joint (13) which allows pivoting of said guiding and supporting means about said guiding axis, and fixing means (14,16) which allow the fixing of said guiding and supporting means in selected pivoted positions relative to said guiding axis.

8. The hand-held machine tool set forth in claim 5 wherein said means for rotating is constructed to make a number of between 5 to 12 revolutions in a given time period, whereas, said means for oscillating is constructed to make one reciprocating movement in said given time period.

* * * * *